United States Patent [19]

Corrales

[11] 4,185,886
[45] Jan. 29, 1980

[54] FIBER OPTIC CONNECTOR

[75] Inventor: Patrick G. Corrales, Garden Grove, Calif.

[73] Assignee: International Telephone and Telegraph Corporation, New York, N.Y.

[21] Appl. No.: 955,179

[22] Filed: Oct. 26, 1978

[51] Int. Cl.² .............................................. G02B 5/14
[52] U.S. Cl. ..................................... 350/96.21
[58] Field of Search ............... 350/96.20, 96.21, 96.22

[56] References Cited

U.S. PATENT DOCUMENTS

| | | | |
|---|---|---|---|
| 3,455,625 | 7/1969 | Brumley et al. | 350/96.22 |
| 4,129,932 | 12/1978 | Stancati | 350/96.21 |

FOREIGN PATENT DOCUMENTS

| | | | |
|---|---|---|---|
| 2522394 | 12/1975 | Fed. Rep. of Germany | 350/96.21 |
| 2516858 | 10/1976 | Fed. Rep. of Germany | 350/96.21 |

*Primary Examiner*—Stewart J. Levy
*Attorney, Agent, or Firm*—Thomas L. Peterson

[57] ABSTRACT

A hermophroditic fiber optic connector is disclosed in which the coupling ring of each connector member may be located in a forward position for coupling to the shell of the mating connector member, or may be shifted to a rear position to open a valve in the wall of the shell of the connector member to vent the interior thereof to atmosphere. When the two connector members are mated, the coupling ring on one opens the valve thereof to vent the connector to atmosphere while the coupling ring on the other is positioned forwardly of its respective valve so that an index matching liquid may be introduced into the mated connector assembly through the other connector member. Because the interior of the connector is vented to atmosphere, liquid may be introduced upwardly through the connector to purge entrapped air out through the open valve in the upper connector member whereby the interior of the connector may be completely filled with the liquid to assure that an index matching film is maintained between the mating ferrules in the two connector halves.

11 Claims, 3 Drawing Figures

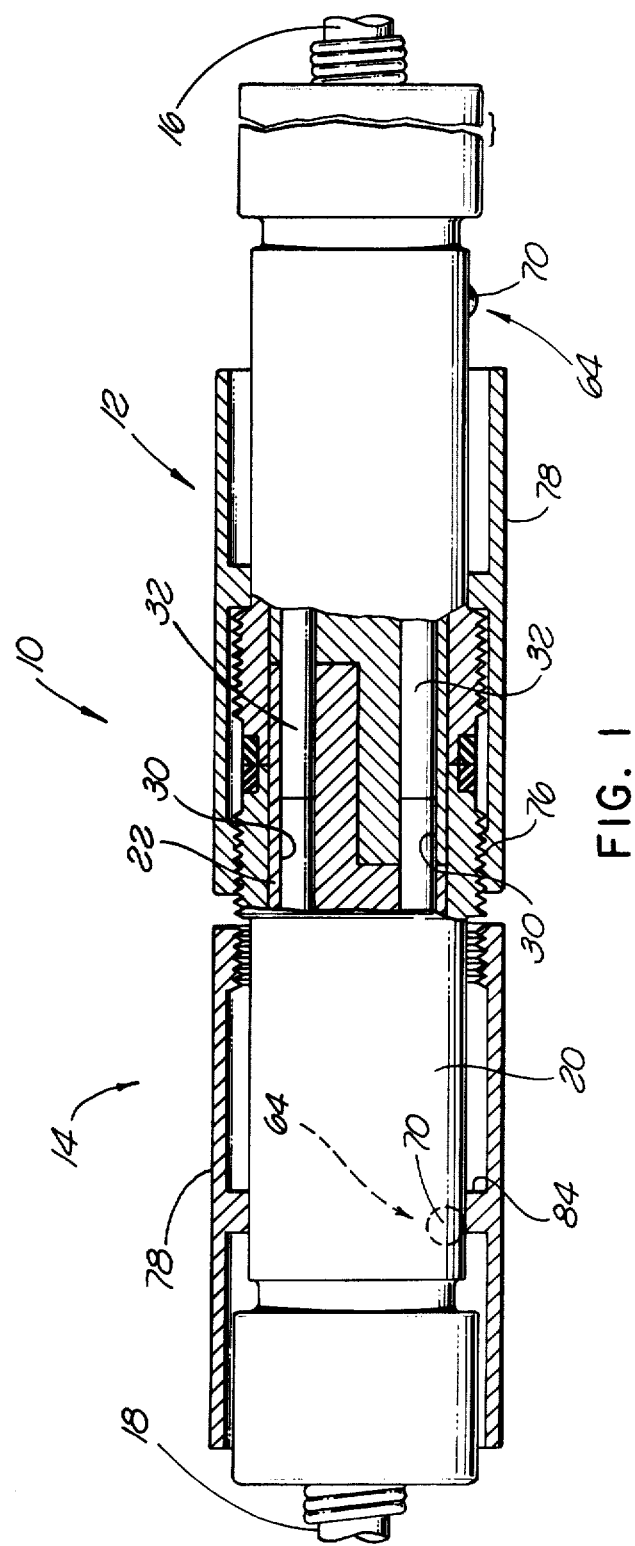

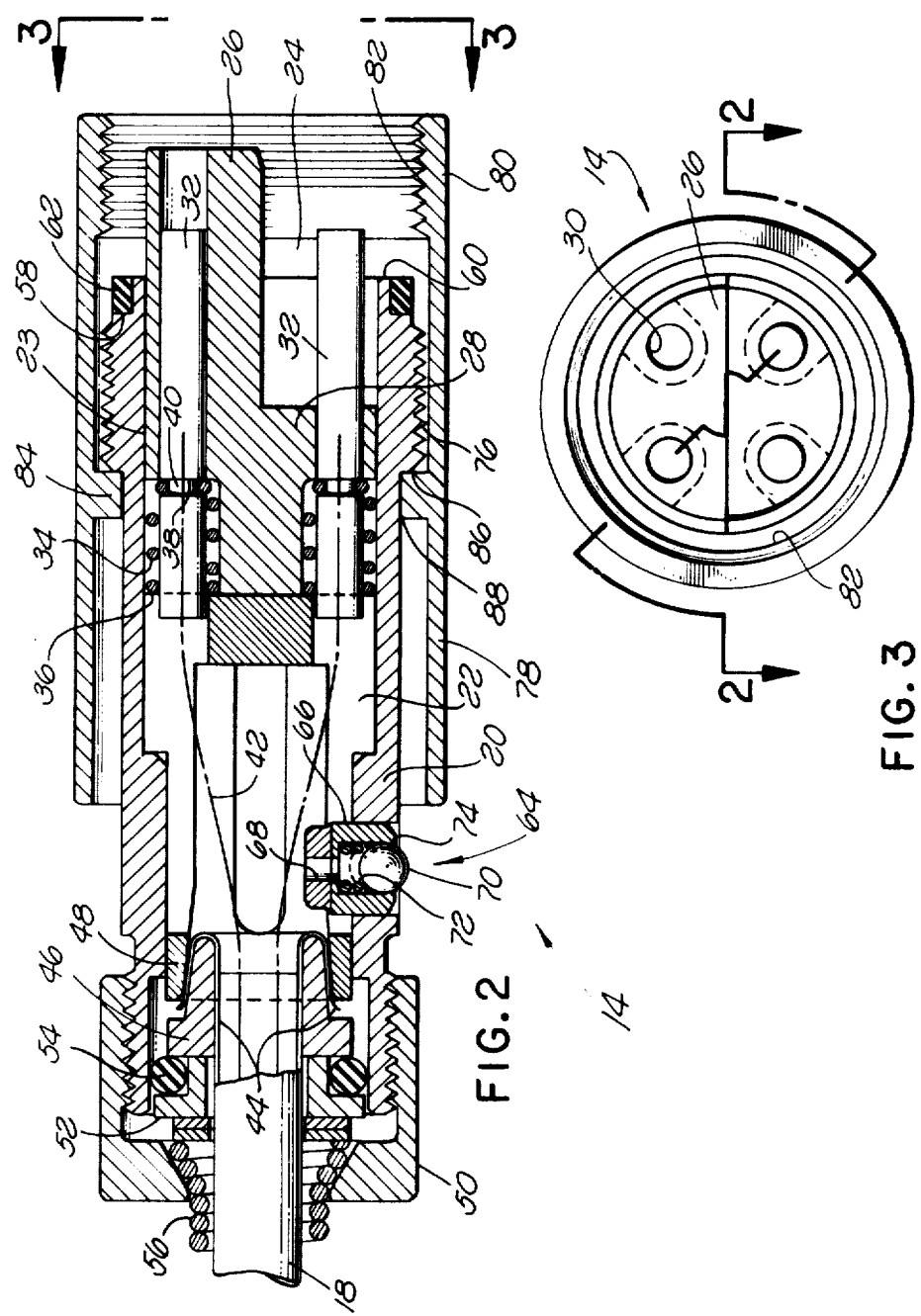

_4,185,886_

FIBER OPTIC CONNECTOR

BACKGROUND OF THE INVENTION

The present invention relates generally to a fiber optic connector and, more specifically, to such a connector in which an index matching liquid is provided between the mating faces of the ferrules in the two connector members of the connector.

It is known in the art that a drop of index matching liquid may be provided between the mating and faces of optical fiber ferrules in an optical fiber connector in order to reduce light transmission losses at the connection of the ferrules. This technique has the disadvantage that during use of the connector the liquid film between the ferrules in the connector may dry out, or escape into the interior of the connector, with the result of a loss in light transmission through the connector.

It has been suggested that the index matching liquid film may be maintained between the mating ferrules in an optical fiber connector by filling the entire connector with the liquid. It is the purpose of the present invention to provide a practical arrangement whereby an optical fiber connector may be completely filled with an index matching liquid without air bubbles being entrapped within the liquid which could result in impairment of the liquid film between at the end faces of the mating ferrules in the connector.

SUMMARY OF THE INVENTION

According to a principal aspect of the present invention, there is provided a fiber optic connector member comprising a shell containing a fiber optic ferrule. An opening is provided in the wall of the shell communicating with the interior of the shell. The interior is adapted to be filled with index matching liquid. Valve means is provided in the opening in the shell. Coupling means is provided on the shell which is movable between a forward and a rear position on the shell. In the forward position of the coupling means on the shell, the coupling means is adapted to couple to a mating connector member and the valve means is exposed. In the rear position of the coupling means on the shell, the coupling means opens the valve means to vent the interior of the connector to atmosphere.

The present invention is particularly adaptable to a hermaphroditic connector in which the connector members are identical, and each is constructed in the manner stated above. With such an arrangement, the coupling means of one connector member is located in its forward position to couple to the shell of the other connector member, while the coupling means on the other connector member is in its rear position opening the valve means in its shell to vent the interior of the entire connector to atmosphere. Index matching liquid may be introduced into the first connector member through its exposed valve means. Because the interior of the connector is vented to atomsphere, if the connector is filled from the bottom, the rising index matching liquid in the connector will purge the interior of the connector of any entrapped air so that the connector will become completely filled with the liquid with no bubbles therein, thus assuring that a uniform film of index matching liquid will be constantly provided between the end faces of the mating fiber optic ferrules in the connector.

BRIEF DESCRIPTION OF THE DRAWINGS

FIG. 1 is a partial longitudinal sectional view of the connector of the present invention with the two connector members thereof fully mated;

FIG. 2 is an enlarged longitudinal sectionial view through one of the connector members illustrated in FIG. 1; and FIG. 3 is a front end view of the connector member illustrated in FIG. 2.

DESCRIPTION OF THE PREFERRED EMBODIMENT

Referring now to the drawings in detail, there is illustrated in FIG. 1 the fiber optic connector of the present invention, generally designated 10. The connector comprises a pair of connector members 12 and 14. In the preferred embodiment of the invention, the connector 10 is hermaphroditic and, therefore, the connector members 12 and 14 are identical. The connector member 12 is connected to a fiber optic cable 16 while the connector member 14 is connected to a second optic cable 18. Each cable contains a plurality of single optical fibers. Each fiber is terminated by a ferrule. When the connector members 12 and 14 are mated, the ferrules in the respective connector members are alined to couple the fibers in the two cables 16 and 18.

Reference is now made to FIG. 2 of the drawing, which illustrates in detail the connector member 14, it being understood that the connector member 12 is identical thereto. The connector member 14 comprises a shell 20 containing a yoke 22 and ferrule guide 23. The guide has a stepped forward end, as indicated at 24, providing a forward semi-cylindrical segment 26 and rear semi-cylindrical segment 28. Each such segment embodies a pair of longitudinally extending bores 30. Four such bores are shown by way of illustration only. As best seen in FIG. 3, the bores are offset 90 degrees from each other so as to be symmetrically arranged in the support. A fiber optic ferrule 32 is slidably mounted in each of the bores 30. A coil spring 34 surrounds the rear of each ferrule. The spring engages a forwardly facing shoulder 36 on the yoke and a rearwardly facing shoulder 38 formed by an annular groove 40 in the ferrule. The springs 34 bias the ferrules forwardly in their respective bores 30.

Each ferrule 32 is terminated to a single optical fiber 42 of the cable 18. The strength members 44 of the cable are clamped between a ring 46 and a rear annular portion 48 of the yoke 22. A cap 50 through which the cable 18 extends is threaded to the rear of the connector shell 20. The cap pushes a retaining ring 52 forwardly to compress an elastomeric O-ring 54 against the rear of the ring 46 to seal the rear of the shell 20. A strain relief spring 56 is retained by the cap and extends outwardly therefrom around the cable 18. For a more detailed description of the connector structure described so far, reference may be had to my co-pending application Ser. No. 955,178 filed concurrently herewith, entitled: "Hermaphroditic Fiber Optic Connector".

An annular groove 58 is formed in the shell 20 opening at the front face 60 thereof and at the outer periphery of the shell. An annular sealing ring 62 is mounted in groove 58. When the two connector members 12 and 14 are mated, the respective sealing rings of the two mating halves of the connector engage each other to provide an interfacial seal therebetween. Thus, the O-rings 54 and sealing rings 62 in the two connector members 12 and 14 provide a completely sealed connector construction when the connector members are fully mated.

A valve, generally designated 64, is provided in the wall of the shell 20. The valve comprises a generally cylindrical retainer 66 in the wall having an opening 68 extending therethrough. The movable valve element 70 of the valve comprises a spherical element which is biased outwardly by a spring 72 against a frusto conical valve seat 74 for closing the opening 68. It will be appreciated that if the valve element 70 is depressed radially inwardly, the valve 64 will be opened.

The shell 20 embodies an externally threaded forward end 76. A coupling ring, generally designated 78 is mounted on the shell 20. The coupling ring is both rotatable with respect to the shell and movable longitudinally relative thereto. The forward end 80 of the coupling ring is internally threaded, as indicated at 82. The threads 82 and 76 match so that the threads 82 on the coupling ring may engage the threads 76 on the mating connector member 12 or, alternatively, the coupling ring may be threaded rearwardly from the forward position illustrated in FIG. 2 to a rear position as shown for the connector member 14 in FIG. 1. In the forward position of the coupling ring, the valve element 70 of the valve 64 is exposed.

The coupling ring embodies an inwardly extending annular flange 84 spaced behind the internal threads 82 thereon. The flange engages a rearwardly facing annular shoulder 86 on the shell 20 to limit forward movement of the ring on the shell. In the forwardmost position of the coupling ring on the shell, the forward threaded end 80 of the ring extends forwardly of the front face 60 of the shell so as to be capable of threadedly engaging the threads 76 on the mating connector member 12.

When the coupling ring is threaded rearwardly over the threads 76 on its own shell to the position illustrated for the connector member 14 in FIG. 1, the inner rear corner 88 on the flange 84, which provides a cam surface, engages the valve element 70 urging it radially inwardly, as shown in dotted lines of FIG. 1, thereby opening the valve 64 and venting the interior of the connector shell 20 to atmosphere.

In order to couple the members 12 and 14 together, they must be positioned rotatably relative to each other so that the forward semi-cylindrical segment 26 of the connector member 14 is offset 180° from the forward semi-cylindrical segment of the connector member 12 as seen in FIG. 1. When the connector members are assembled together in this fashion, the coupling ring 78 on the connector member 12 can threadedly engage the forward end 76 of the shell of the connector member 14 drawing the two halves of the connector together. As the two connector members 12 and 14 are being mated, the two upper ferrules 32 of the connector 12 will slide into the upper bores 30 of the guide 23 in connector member 14, while the lower ferrules 32 will slide into the lower bores 30 in the guide of the connector member 12. The sliding engagement of the ferrules into the opposite ends of the bores achieves lateral alignment of the ferrules and consequently of the optical fibers which are centrally mounted therein. Also, when the ferrules in the respective connector members engage each other, they shift rearwardly against the force of the springs 34. As a consequence, the springs maintain the mating end faces of the ferrules in firm abutting relationship.

When the connector members 12 and 14 are fully mated, the annular sealing rings 62 on the front faces of the shells are firmly engaged to provide an interfacial seal between the two connector halves.

When the coupling ring for the connector member 14 is positioned in its rear position as shown in FIG. 1, the coupling rings of the connector member 12 may couple with the threads 76 on the shell of the connector member 14, and the cam surface 88 on the coupling ring of the connector member 14 depresses the valve element 70 inwardly to open the valve thus venting the interior of the connector member 14, and consequently the interior of the entire connector 10 to atmosphere. It will be appreciated that because the ferrules 32 have a sliding fit in the bores 30 in the two connector members, fluid flow communication exists between the respective connector members when mated together.

In order to introduce an index matching liquid into the mated connector 10, a suitable oil filling can (not shown) may be used having a nozzle which fits over the valve 64 of the connector member 12. The nozzle may be properly positioned to engage the valve by locating it against the rear surface of the coupling ring 78 on connector member 12. Pressure on the nozzle depresses the valve element of the valve 64 on the connector member 12 allowing liquid to be injected into the interior of the connector member 12. Preferably the connector assembly 10 is held vertically with the connector member 12 below the connector member 14 so that when index matching liquid is injected through the valve 64 into the connector member 12, the liquid will move upwardly through the mated connector members to purge entrapped air within the connector outwardly through the open valve 64 in the upper connector member 14. Thus in this manner the entire interior of the connector 10 may be completely filled with index matching liquid which will assure that there will constantly be provided a film of such liquid at the interface of the mating ferrules 32 in the two connector members.

It will be appreciated from the foregoing that the present invention provides a simple and inexpensive arrangement for allowing the complete filling of a hermophroditic fiber optic connector with an index matching liquid. The connector structure allows the filling of the connector with such liquid by unskilled personnel, and assures that an effective interfacial film of index matching liquid will be constantly provided between the mating faces of the ferrules in to connector members of the connector.

What is claimed is:
1. A fiber optic connector member comprising:
  a shell containing a fiber optic ferrule;
  an opening in the wall of the said shell communicating with the interior of said shell, said interior being adapted to be filled with an index matching liquid;
  valve means in said opening;
  coupling means on said shell movable between forward and rear positions on said shell;
  in said forward position said coupling means being adapted to couple to a mating connector member and exposing said valve means and;
  in said rear position said coupling means opening said valve means to vent said interior to atmosphere.

2. A fiber optic connector member as set forth in claim 1 wherein;
  said valve means includes a movable element in said opening protruding outwardly beyond the outer surface of said shell; and said coupling means embodies a cam surface which engages said valve element to open said valve means when said coupling means is in said rear position.

3. A fiber optic connector member as set forth in claim 2 wherein;
said coupling means embodies an internally threaded forward end spaced forwardly of said cam surface; and
said forward end of said coupling means extends forwardly of said shell when in said forward position.

4. A fiber optic connector member as set forth in claim 3 wherein;
said shell has an internally threaded forward end spaced forwardly of said valve means; and
when said coupling means is in said forward position, said cam surface is located between said valve element and said externally threaded forward end of said shell.

5. A fiber optic connector member as set forth in claim 4 wherein;
the threads on said coupling means are threadedly engageable with the threads on said shell whereby said coupling means may be threaded rearwardly on said shell to said rear positions.

6. A fiber optic connector member as set forth in claim 4 wherein;
said shell embodies a rearwardly facing shoulder; nad
said coupling means embodoes an inner annual flange providing said cam surface, said flange abutting said shoulder when said coupling means is in said forward position.

7. A fiber optic connector member as set forth in claim 1 wherein;
said shell contains a guide supporting a plurality of said ferrules;
said guide having a stepped forward end providing a forward segment and rear segment; and
said ferrules being symmetrically arranged in said segments to provide a hermaphroditic construction.

8. A fiber optic connector member as set forth in claim 1 including;
annular sealing means on the front face of said shell.

9. A hermaphroditic optical fiber connector comprising;
a pair of like connector members;
each said connector member comprising a shell containing a fiber optic ferrule, an opening in the wall of said shell communicating with the interior of said shell, said interior being adapted to be filled with an index matching liquid, valve means in said opening, and coupling means on said shell movable between forward and rear positions on said shell;
in said forward position said coupling means being adapted to couple to the other connector member and inposing said valve means and;
in said rear position said coupling means opening said valve means to vent said interior to atmosphere;
when said connector members are mated the coupling means on one of said connector members being in said forward position to couple with the other connector member; and
the coupling means on said other connector member being in said rear position to open the valve means thereon whereby the liquid may be introduced into the connector through the valve means on said one connector member and the interior of the connector will be vented to atmosphere through the open valve means on said other connector member.

10. A hermaphroditic optical fiber connector as set forth in claim 9 wherein;
the forward end of the shell of each said connector member is externally threaded;
the coupling means of each said connector member embodies an internally threaded forward end and an internal cam ring spaced behind said forward end;
the internally threaded forward end of said coupling means of said one connector member being threadedly engaged with the threaded forward end of said shell of said other connector member; and
said internal cam ring on said coupling means of said other connector member engages said valve means thereon.

11. A hermaphroditic optical fiber connector as set forth in claim 10 wherein;
the internally threaded forward end of the coupling means of each said connector member is threadable with the external threads on the shell of said connector member whereby said coupling means may be threadedly shiftable between said forward and rear positions when said connector members are unmated.

* * * * *